UNITED STATES PATENT OFFICE 2,520,194

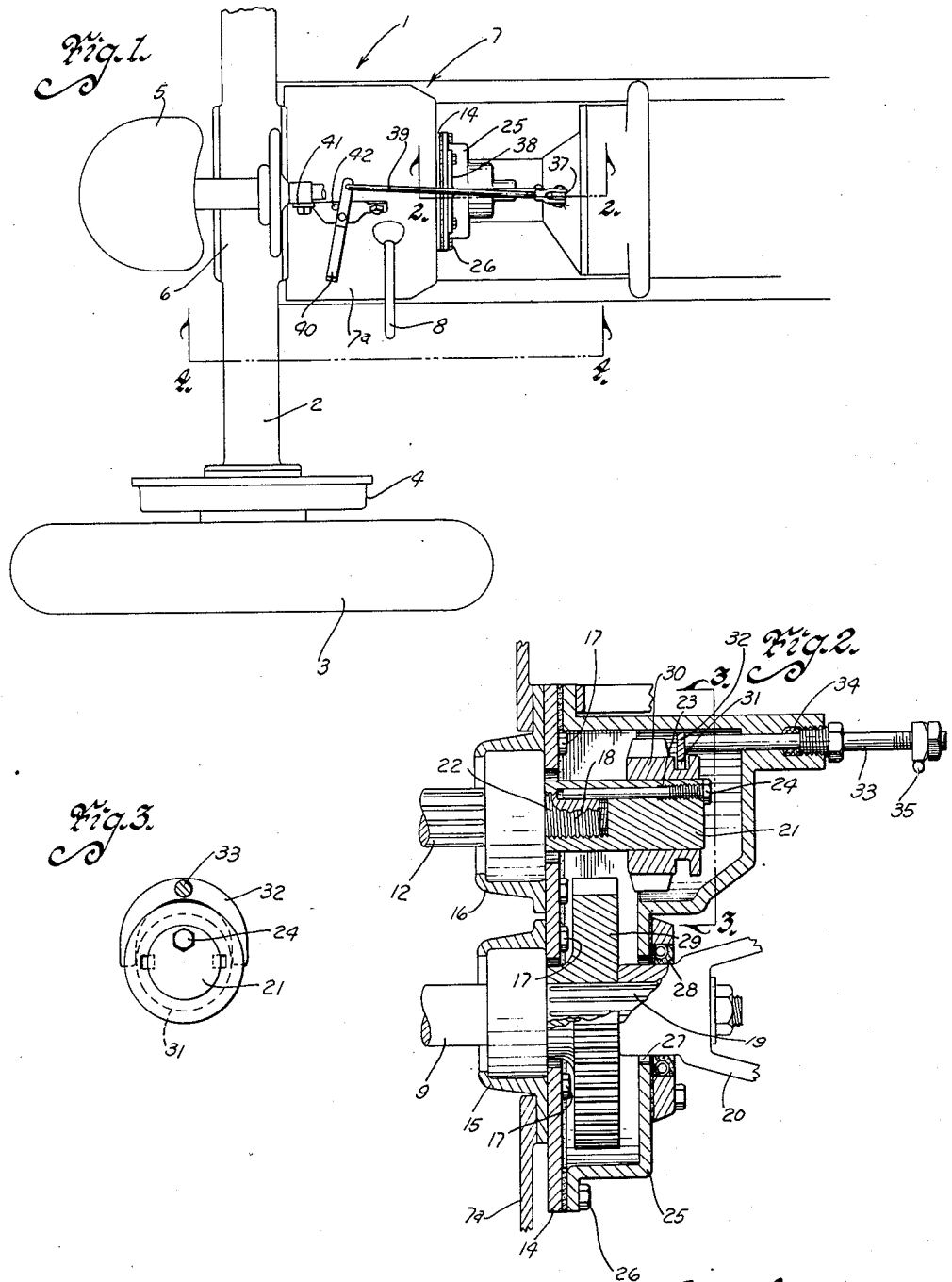

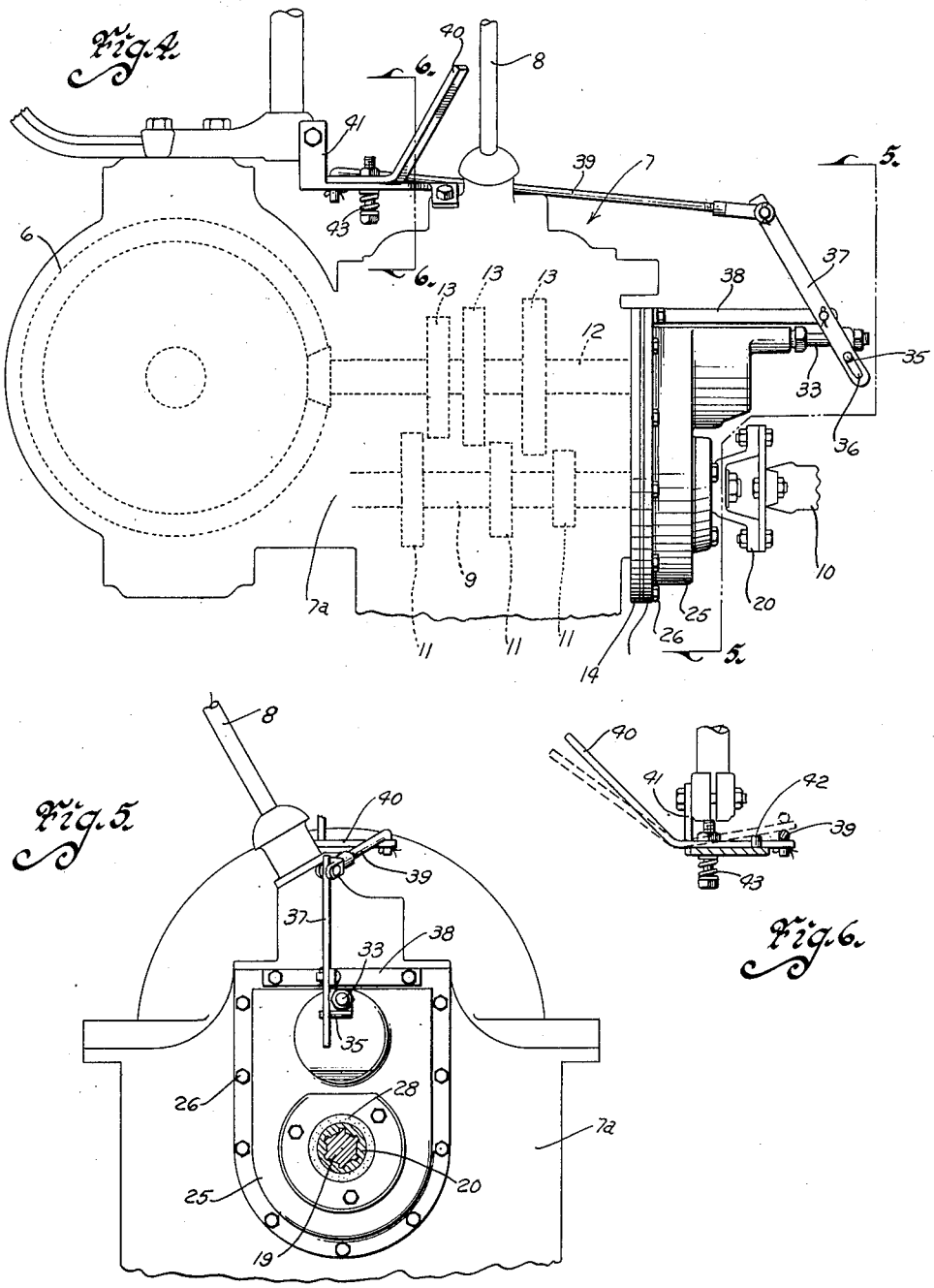

HIGHER SPEED GEAR

Roy E. Bennett and David A. Bennett, Lenox, Iowa

Application August 9, 1947, Serial No. 767,757

1 Claim. (Cl. 74—745)

This invention relates to a higher speed gear to be placed on a vehicle and more particularly to a higher speed gear assembly to be placed on a tractor that was originally manufactured for low speed operation.

There are many tractors still in operation that were originally manufactured with solid metal wheels for low speed operations on a farm. With the advent of our new highways, most cleated metal wheeled tractors are barred from the highways. Further, the metal wheeled tractors are hard riding and it has been found desirable to equip the tractors with rubber tires. When the tractors are equipped with rubber tires, they may then be operated on the highways and it is desired to travel at a faster rate of speed than the tractor is equipped to run. It is with the problem of adding a higher speed gear to a tractor that the present invention is involved.

It is an object of the invention, among others, to provide a higher speed gear for a tractor in order that the tractor may attain a higher speed than it was originally designed to produce; a higher speed gear for a tractor that can easily be adapted and mounted on a tractor without disassembly of too many parts on the tractor; a higher speed gear that is simple in construction and operation, easy to operate and economical both in construction and operation; a higher speed gear that is just as long lasting and durable as the original gears; a higher speed gear operable when the original gears are unmeshed; and a higher speed gear requiring no special skill to mount on the tractor.

In carrying out the objects of the invention the present improvement is incorporated in a tractor which has a main driving shaft connected to the tractor engine and a driven shaft is connected to the wheels of the tractor. A housing contains the driving and driven shafts therein with said driving and driven shafts having a series of gears on the respective shafts within the housing. The gears on the driving and driven shafts are adapted to mesh to give different speeds for the driven shaft. A gear shift lever is on the tractor to mesh the respective gears on the driving and driven shafts for the speed desired. The improvement resides in a second housing attached to one end of the first mentioned housing. A separate plate member is attached to the end of the first housing with the second housing attached to the plate member. There are portions attached to the driving and driven shafts to extend the driving and driven shafts through the plate member into the second housing and gears are connected to the portions of the driving and driven shafts within the second housing. There are means which may be a second gear shift lever connected with the gear on the driving shaft within the second housing, to shift said gear into meshing relationship with the gear on the driven shaft within the second housing when the gears within the first housing are in unmeshed relation.

With the foregoing and other objects in view, the invention will be more fully described herewith and will be particularly pointed out in the claim appended hereto.

In the drawings, wherein like symbols refer to like or corresponding parts throughout the several views:

Figure 1 is a top plan view of the rear of a tractor showing one rear wheel, differential and power transmission means.

Figure 2 is a sectional view taken through the line 2—2 of Figure 1.

Figure 3 is a part sectional and part elevational view through the area which line 3—3 passes and the area to the left of the arrows.

Figure 4 is a side elevational view within the area upwardly of line 4—4 of Figure 1 and looking in the direction of the arrows with the improvement shown in shaded lines.

Figure 5 is a part sectional and part elevational view of the area defined by line 5—5 of Figure 4 and through which the line 5—5 passes.

Figure 6 is a part sectional and part elevational view of the portion through which line 6—6 of Figure 4 passes and of the area to the left of line 6—6 of Figure 4.

A tractor, represented generally at 1, is shown in Figure 1 having a rear axle 2, rear wheels, one of which is shown at 3, brake drums, one of which is shown at 4, a seat 5 for the operator of the tractor, a differential 6 (best shown in Figure 4), a transmission 7 and a gear shift lever 8 to shift gears within the transmission 7 into meshed or unmeshed relationship.

The transmission 7 (Figure 4) is included within a housing 7a and has a driving shaft 9 suitably journaled in housing 7a and connected through a shaft 10 with the power source of the tractor 1, gears 11 are connected on the shaft 9 and are of different diameters for different speed ratios as well known in the gear transmission art. A second shaft, or driven shaft 12, having gears 13 of different diameter mounted thereon, mesh with the gears 11 on the shaft 9 to give different speeds for the driven shaft 12. The gear shift lever 8 may be shifted in a well known manner to select the proper gears 13 and 11 to be meshed to give the speed ratio desired. The shaft 12 transmits power to the rear wheels 3 of the tractor to propel the tractor.

The original cap closures that closed the openings in housing 7a made for the purpose of journalling shafts 9 and 12 are removed and eliminated. A plate 14 is attached to the end of housing 7a and fastened to housing 7a by having openings in the plate 14 that align with openings in the housing 7a for the individual closure plates. The shafts 9 and 12 are journaled in separate bearing members 15 and 16 which are attached in any suitable manner to the end of the housing 7a. The plate 14 is in effect attached to the bearing members 15 and 16 by bolts 17 and the plate 14 becomes a part of the housing 7a. The shaft 9 has a portion thereof extending beyond the plate 14 (not shown) in a manner similar to the portion 18 of the shaft 12.

A portion 19 is connected to the shaft 9 to extend the shaft 9 beyond the plate 14 and the extension portion 19 connects to coupling 20 which in turn connects to main driving shaft 10. A portion 21 is connected to the shaft 12 to extend the shaft 12 beyond the plate 14. The extension portion 21 shows how both extensions 19 and 21 are connected to the shafts 9 and 12. The ends of the shafts 9 and 12 are screw threaded as at 22 and the extensions 19 and 21 are screw threaded to the shafts 9 and 12. An opening 23 is drilled through the extensions 19 and 21 and a portion of the screw threaded shaft ends are also drilled to receive a locking pin 24 to prevent turning movement between the extension portions and the shaft ends.

A second housing member 25 is so formed as to completely enclose the shaft ends and extension portions 19 and 21. The second housing 25 is attached to the plate 14 as by bolts 26 and has a suitable packing means 27 between the housing 25 and plate 14 to seal off the joint between the two members 14 and 25. The shaft extension 19 has coupling 20 attached within the second housing 25 and opening 27, which is suitably sealed by packing 28 and allows coupling 20 to extend outwardly of the second housing 25. The extension portion 19 carries a gear 29 rigidly secured to the spliced extension portion 19, hence rotatable therewith. The extension portion 21 has gear 30 slidably attached thereon and of a smaller diameter than the gear 29 attached to the extension portions 19, hence the larger gear 29 being attached to the driving shaft 9 and the gear 30 attached to the driven shaft 12, the speed of the driven shaft 12 will be increased when gears 29 and 30 are meshed and the speed of the driven shaft 12 will be increased.

The gear 30 has a groove 31 into which a fork 32 fits for moving the gear 30 into meshed and unmeshed relationship with the gear 29. The fork 32 connects to a rod 33 which extends through stuffing box 34 to outside the second housing 25. Referring now to Figure 4, the rod 33 is shown as having a pin 35 attached thereto which pin 35 is received in slot 36, in the rod 37. The rod 37 is pivotally supported from arm 38 which arm 38 is in turn supported from the second housing 25. The other end of rod 37 is pivotally connected to the rod portion 39 which extends rearwardly from the second housing 25 to a handle 40 which is pivotally mounted on a supporting bracket 41 rigidly mounted on a part of the tractor 1. The supporting bracket 41 has a peg 42 projecting therefrom and the handle 40 has a portion extending through the bracket 41 surrounded by a spring 43 to allow the handle 40 to be pivoted as suggested in Figure 6, so the handle portion can be raised over the peg 42 as suggested in dotted line. The peg 42 therefore serves to hold the gear 30 in meshed relationship with the gear 29 when the handle 40 is against one side of the peg 42 and to hold the gear 30 in unmeshed relationship with the gear 29 when the handle 40 is against the other side of the peg 42.

In operation, the gears 13 and 11 must be in neutral or unmeshed relation before the gears 29 and 30 can be shifted into meshed relationship. After the tractor 1 has attained speed, the gear shift lever 8 may be placed in neutral position so the gears 11 and 13 will be in unmeshed relationship, then the gears 29 and 30 may be meshed by movement of gear shift rod 40.

It will be understood that the invention has been described for purposes of illustration and explanation and changes and variations are possible without departing from the scope of the invention; all such modifications and changes are intended to be included in the appended claim.

We claim:

In an auxiliary transmission designed to be attached to a main transmission having a housing with at least one flat side through which extend the threaded end of a driven shaft, and the splined end of a driving shaft, a plate of greater dimensions than said flat side of said housing, a means for securing said plate to the flat side of said housing, an auxiliary housing secured to said plate, a driven shaft extension member having a threaded well in one end capable of and intended to screw on to the threads on said driven shaft, a locking member for securing said driven shaft extension member in a fixed relation to said driven shaft, a gear slideably splined on said driven shaft extension member, a driving shaft extension member capable of and intended to be secured in a fixed relation to said driving shaft and extending through said auxiliary housing, a gear splined on said driving shaft extension member, a universal joint member journaled in and extending through said auxiliary housing; said universal joint member being splined on said driving shaft extension member, seated against said gear on said driving shaft extension member, and secured against longitudinal movement by suitable means, a bore in said auxiliary housing, a gear shifting rod slideably embraced by said bore in said auxiliary housing, a gear shifting lever, and a rod linkage for operatively connecting said gear shifting lever and said gear shifting rod; said gear shifting rod capable of and intended to move said gear on said driven shaft extension member into a meshing relation with said gear on said driving shaft extension member at times.

ROY E. BENNETT.
DAVID A. BENNETT.

REFERENCES CITED

The following references are of record in the file of this patent:

UNITED STATES PATENTS

| Number | Name | Date |
| --- | --- | --- |
| 1,550,058 | Carhart | Aug. 18, 1925 |
| 1,859,788 | Padgett et al. | May 24, 1932 |
| 1,961,809 | Wood | June 5, 1934 |
| 2,934,778 | Storey | Mar. 24, 1936 |
| 2,046,429 | Ronning | July 7, 1936 |
| 2,090,154 | Ronning | Aug. 17, 1937 |
| 2,369,078 | Shaeffer | Feb. 6, 1945 |

FOREIGN PATENTS

| Number | Country | Date |
| --- | --- | --- |
| 8,791 | Great Britain | Apr. 22, 1908 |